United States Patent [19]

Wang

[11] Patent Number: 5,161,629
[45] Date of Patent: Nov. 10, 1992

[54] HELICAL PIPE INCORPORATED IN A HYDRAULICALLY ACTUATED SCALE

[75] Inventor: John Wang, Chiayi City, Taiwan

[73] Assignee: Lee Wang Industry, Ltd., Chiayi, Taiwan

[21] Appl. No.: 744,261

[22] Filed: Aug. 13, 1991

[30] Foreign Application Priority Data

Jun. 10, 1991 [TW] Taiwan ................. 80206954

[51] Int. Cl.$^5$ ................. G01G 5/04; G01L 19/12
[52] U.S. Cl. ................. 177/208; 177/254; 116/271
[58] Field of Search ................. 177/208, 209, 254; 116/271

[56] References Cited

U.S. PATENT DOCUMENTS 3,866,464 2/1975 Franklin ................. 177/208 X
4,056,156 11/1977 Dayton ................. 177/209
4,219,090 8/1980 Dayton ................. 177/208

Primary Examiner—George H. Miller, Jr.
Attorney, Agent, or Firm—Michael N. Meller

[57] ABSTRACT

A Bourdon's pipe that includes a clamping member at its sealed end. A threaded hole is bored through the clamping member into which a first bolt with a head is threaded whereat the head sealingly abut against the clamping member. The first nut has a passage including a constricted section with open end communicating with the interior of the Bourdon's pipe, and a valve seat adjacent to the constricted section. A movable ball-shaped valve is provided in the passage of the first bolt. A second bolt threaded into the passage of the first bolt to adjustably abut the ball-shaped valve against the valve seat.

1 Claim, 4 Drawing Sheets

HELICAL PIPE INCORPORATED IN A HYDRAULICALLY ACTUATED SCALE

BACKGROUND OF THE INVENTION

1. Field of Invention

This invention relates to a helical pipe, more particularly to a Bourdon's helical pipe incorporated in a hydraulically actuated weighting scale, the helical pipe of which has an air releasing means provided at its sealed end thereof.

2. Description of the Related Art

Scales are widely used for measuring the weight of objects or people. The general requirements for a scale are: application of the range of weight to be measured, accuracy in displaying the weight readings, linearity in responding to weight changes and simplicity in mechanical construction thereof. Various kinds of scales have been available in the past; a popular one is shown in FIG. 1 for measuring weight which uses a pressurized fluid means to actuate an indicating needle thereby to read a weight applied thereon. As shown, the scale is composed of a base member A, a top cover B, a gage D and a dial D1 for displaying the weight reading, an assembly of levers B2 and having four fulcrums B1 and a force exerting terminal B3 and a weight sensor C which is usually made of a spring assembly with said force exerting terminal B3 arrested thereon, and a oil pump E with a first pipe E1 connected to said gage D and second pipe E2 connected to said weight sensor C. It is known that the weight sensor C actually serves as an intermediate means for transferring the sensed pressure to the pressure gage D. In this scale, a Bourdon's pipe is used as an intermediate transmission apparatus to sense the applied weight.

FIG. 2 shows the scale of FIG. 1 with the top cover B removed. As illustrated, the Bourdon's pipe F2 is in the shape of a "C", an oval cross-section through which pressurized fluid from a fluid inlet F11 can flow. When the pressure inside the pipe F2 is increased, the oval pipe F2 tends to become circular and this causes the pipe F2 to straighten. The sealed inner end portion F21 of the pipe F2 will impel an end of a connected rod F3. The other end of the connecting rod F3 in turn rotates a sector gear F5 about a pivot pin F14 so that an indicating needle F61 is rotated by meshing the teeth of the sector gear F5 with a gear shaft F7 on which the indicating needle F61 is mounted so as to indicate an applied weight on the dial. When the applied weight is removed, the indicating needle F61 is pushed back to the original position by a torsion spring F8 having one end connected to said indicating needle F61 and the other end connected to a support F9, whereat the needle rests to point "0" on the dial D1.

It has been found that the hydraulically actuated scale which uses a helical pipe as a weight transmission apparatus that can measure an object or a person only within a limited range. The above-mentioned scale can not be accurately used to measure a weight outside of the limited range, because a pressurized fluid is compressed into the open end of Bourdon's helical pipe, some air is trapped within the sealed end of the same. Under this condition, the Bourdon pipe can sense a weight within a certain limited range. There is only one way to change the corresponding weight range of the scale without altering its overall construction. That is to adjustably release the trapped air from the interior of the Bourdon's pipe thereby to adjust the weight range to be measured by the same scale.

SUMMARY OF THE INVENTION

Considering above-referenced comments, it is an object of the present invention to provide an air releasing means at the sealed end of a Bourdon's pipe which is incorporated in a hydraulic actuated scale.

Accordingly, a helical pipe of the present invention, incorporated in a hydraulically actuated scale, has a first open end and a second open end sealed by a clamping member in an air tight relationship. A threaded hole is bored through the clamping member and into the interior of the helical pipe. A first bolt having a head, is threadably inserted into the threaded hole of the clamping member with the head of the first bolt abutting against the clamping member. A seal member is sealingly provided between the clamping member and the head. The first bolt has a passage including a constricted open end communicating with the interior of the helical pipe and a valve seat adjacent to said constricted open end. A ball-shaped valve is movably provided in the passage. A second bolt threaded into the passage of the first bolt to adjustably abut the ball-shaped valve against said valve seat.

BRIEF DESCRIPTION OF THE DRAWINGS

Other features and advantages of the present invention will become more apparent in the following detailed description, including the drawings, all of which show a non-limiting form of the invention, and of which:.

DETAILED DESCRIPTION OF THE PREFERRED EMBODIMENT

Figure 1:
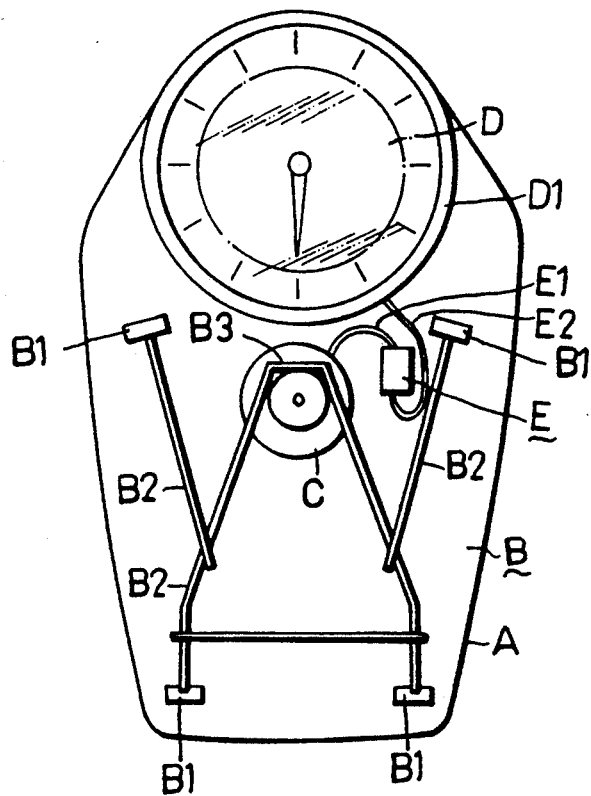
FIG. 1 shows a conventional hydraulically actuated scale which uses a Bourdon pipe therein for sensing an applied weight thereon.
Figure 2:
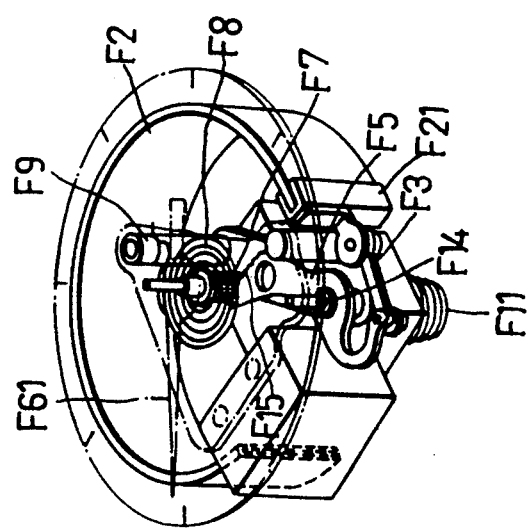
FIG. 2 shows a pressure gage incorporated in the conventional hydraulically actuated scale of FIG. 1.
Figure 3:
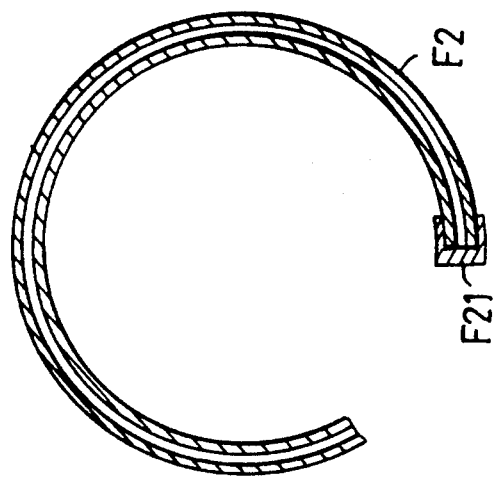
FIG. 3 shows the Bourdon pipe used in the conventional hydraulically actuated scale of FIG. 1.
Figure 5:
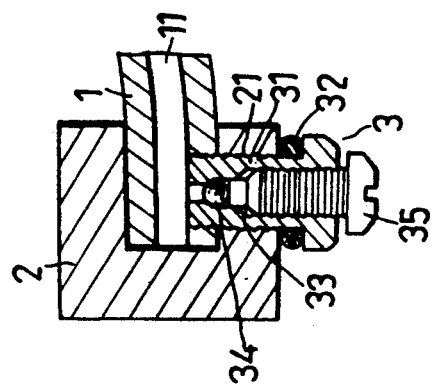
FIG. 5 is an enlarged view of the preferred embodiment of the Bourdon pipe of the present invention.
Figure 4:
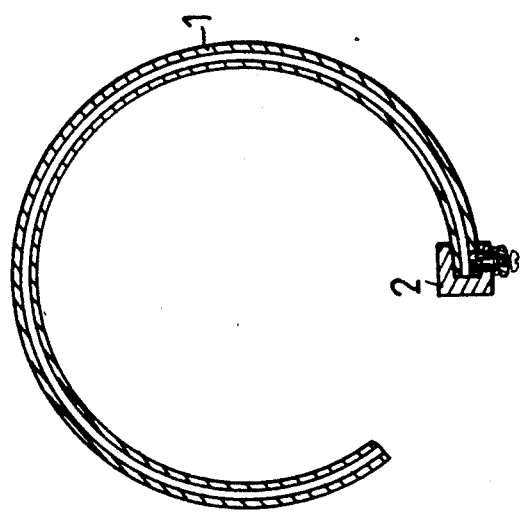
FIG. 4 is a cross sectional view of the preferred embodiment of the Bourdon pipe of the present invention.

Referring to FIGS. 4 and 5, a Bourdon's pipe 1 to be used incorporation with a hydraulically actuated scale, is shown to have a first open end and a second end sealed by a clamping member 2 in an air tight relationship. Given that the Bourdon's pipe is generally very thin, to be able to mount an air releasing means 3 thereto, it is necessary to make the sealed end sufficiently thick. The clamp member is provided thereat for precisely this purpose.

A threaded hole 21 is bored through the clamping member 2, into which a first bolt 31 is threaded in such a manner that the head of the first bolt 31 is abutting against the clamping member 2. A seal washer 32 is sealingly provided around and between the head of the first bolt 31 and the clamping member 2. The first bolt 31 has a passage 33 including a constricted section with open end communicating the interior 11 of the Bourdon pipe, the remaining section of the passage being threaded and a valve seat adjacent to the constricted section. A movable ball shaped valve 34 is provided in the passage for blocking the constricted section of the same.

A second bolt 35 having a slit at its head, is threadably inserted into the passage and adjustably pushed the ball-shaped valve 34 to abut against the valve seat of the constricted section.

When a pressurized liquid is pressed into the interior 11 of the Bourdon pipe 1, some air is trapped within the same. Using such a Bourdon pipe in a pressure gage to measure an applied weight is a known art, and therefore a detailed explanation related to this art is not necessary to reveal here.

This invention only relates to how the trapped air within the Bourdon's pipe can be released. When the second bolt 35 is adjustably loosened by rotating the same, the trapped air within the Bourdon's pipe correspondingly pushes the ball-shaped valve 34 away from the valve seat, thus escaping from the interior of the Bourdon's pipe. The slit at the head of the second bolt 35 is to enable its easy turning by a screw driver.

With the invention thus explained, it is obvious to those skilled in the art that several variations and modifications can be made without departing from the scope and spirit of the present invention. It is therefore intended that these claims be treated only as in the appended claims.

I claim:

1. A helical pipe incorporated in a hydraulic actuated scale, includes a first open end and a second end sealed by a clamping member in an air tight relationship;

characterized in that said clamping member has a threaded hole therethrough and in communication with the interior of said helical pipe;

a first bolt has a head, and is threaded into said threaded hole of said clamping member with said head of said first bolt being abutting against said clamping member;

a seal member being sealed between said head and said clamping member, said first bolt having a passage including a constricted open end communicated with the interior of said helical pipe and a valve seat adjacent to said constricted open end;

a movable ball-shaped valve plug provided in said passage of said first bolt to abut against said valve seat; and a second bolt threaded into said passage and adjustable to push said valve plug to abut against said valve seat.

* * * * *